(12) United States Patent
Martin et al.

(10) Patent No.: US 8,517,693 B2
(45) Date of Patent: Aug. 27, 2013

(54) MULTI-COMPRESSOR STRING WITH MULTIPLE VARIABLE SPEED FLUID DRIVES

(75) Inventors: William L. Martin, Houston, TX (US); Christopher G. Holt, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 861 days.

(21) Appl. No.: 12/085,047

(22) PCT Filed: Nov. 8, 2006

(86) PCT No.: PCT/US2006/043287
§ 371 (c)(1),
(2), (4) Date: May 13, 2008

(87) PCT Pub. No.: WO2007/078418
PCT Pub. Date: Jul. 12, 2007

(65) Prior Publication Data
US 2009/0260367 A1    Oct. 22, 2009

Related U.S. Application Data

(60) Provisional application No. 60/753,717, filed on Dec. 23, 2005.

(51) Int. Cl.
*F04B 49/00* (2006.01)

(52) U.S. Cl.
USPC .......... 417/223; 417/319; 417/429; 192/3.28; 60/335

(58) Field of Classification Search
USPC ................. 417/223, 319, 429, 313, 381, 244, 417/267; 192/3.21–3.33; 60/330, 335
See application file for complete search history.

(56) References Cited

U.S. PATENT DOCUMENTS 2,194,054 A    3/1940  Peterson
2,301,645 A   11/1942  Sinclair (Continued)

FOREIGN PATENT DOCUMENTS

DE    915022        7/1954
DE    1903214 A1    8/1970

(Continued)

OTHER PUBLICATIONS

Voith Turbom Compressor Starting Torque Converter, Vosycon, product brochure, 6 pages.*

(Continued)

*Primary Examiner* — Devon Kramer
*Assistant Examiner* — Thomas Fink
(74) *Attorney, Agent, or Firm* — ExxonMobil Upstream Research Co. Law Dept.

(57) ABSTRACT

Starter arrangement for high power rotating equipment strings with multiple compressors driven by a single turbine or motor includes multiple variable fluid drive torque converters (CSTCs) to start the compressors in a pressurized start. The string can use a single CSTC for each compressor or a single CSTC for more than one compressor with at least two CSTCs for a given string. The starting procedure is sequential. After the turbine or motor is started and brought up to speed, successive CSTCs are operated from zero to lock-up speed sequentially to start each compressor or group of compressors in turn. In order to cool the working fluid of the CSTCs, a single heat exchanger is provided and the working fluid of each CSTC in turn is circulated through the heat exchanger as they are sequentially started. At lock-up speed, the CSTC is locked up, the working fluid is drained, and the working fluid of the active CSTC is isolated from the heat exchanger and the next succeeding CSTC in the start sequence is in turn, filled with the working fluid and connected to the heat exchanger. At full start, with all compressors operating at full speed, no working fluid is present in the CSTCs, and no working fluid is circulated through the heat exchangers from the locked-up CSTCs. A single heat exchanger may also be used for multiple strings, each having multiple CSTCs for multiple compressors. The starter arrangement is useful in high compressor load strings for LNG refrigeration service.

10 Claims, 4 Drawing Sheets

(56) References Cited

U.S. PATENT DOCUMENTS

| | | | |
|---|---|---|---|
| 2,377,851 A | 6/1945 | Blank | |
| 2,547,660 A | 4/1951 | Prince | |
| 2,940,338 A | 6/1960 | Wood | |
| 3,043,162 A | 7/1962 | Kugel et al. | |
| 3,228,858 A | 1/1966 | Matyear | |
| 3,677,033 A | 7/1972 | Kneeland | |
| 3,724,226 A | 4/1973 | Pachaly | |
| 3,735,600 A | 5/1973 | Dowdell et al. | |
| 3,764,815 A | 10/1973 | Habock et al. | |
| 3,780,534 A | 12/1973 | Lofredo et al. | |
| 3,790,086 A | 2/1974 | Masai | |
| 3,886,729 A | 6/1975 | Amann et al. | |
| 3,888,082 A | 6/1975 | Haide | |
| 3,919,837 A | 11/1975 | Pradt et al. | |
| 3,955,365 A * | 5/1976 | Arao | 60/330 |
| 4,073,139 A | 2/1978 | Armasow et al. | |
| 4,077,743 A | 3/1978 | Cochrane et al. | |
| 4,077,748 A | 3/1978 | Potz | |
| 4,082,011 A | 4/1978 | McQuinn et al. | |
| 4,117,343 A | 9/1978 | Hoffeins | |
| 4,119,861 A | 10/1978 | Gocho | |
| 4,220,057 A | 9/1980 | Kronogärd | |
| 4,359,871 A | 11/1982 | Strass | |
| 4,389,842 A | 6/1983 | Behnert | |
| 4,404,812 A | 9/1983 | Zinsmeyer | |
| 4,434,613 A | 3/1984 | Stahl | |
| 4,463,556 A * | 8/1984 | Polzer et al. | 60/330 |
| 4,503,666 A | 3/1985 | Christoff | |
| 4,566,885 A | 1/1986 | Haak | |
| 4,570,449 A * | 2/1986 | Knokey et al. | 62/183 |
| 4,686,822 A | 8/1987 | Frutschi | |
| 4,708,793 A | 11/1987 | Cathriner et al. | |
| 4,726,255 A | 2/1988 | Humpfer et al. | |
| 4,783,008 A | 11/1988 | Ikeuchi et al. | |
| 4,830,584 A | 5/1989 | Mohn | |
| 4,848,084 A | 7/1989 | Wirtz | |
| 4,860,803 A | 8/1989 | Wells | |
| 4,892,467 A | 1/1990 | Crofoot | |
| 4,951,467 A | 8/1990 | Walsh et al. | |
| 4,964,843 A | 10/1990 | Wahl | |
| 4,968,231 A | 11/1990 | Zimmern et al. | |
| 5,123,239 A | 6/1992 | Rodgers | |
| 5,491,969 A | 2/1996 | Cohn et al. | |
| 5,662,463 A | 9/1997 | Mirzoev et al. | |
| 5,689,141 A * | 11/1997 | Kikkawa et al. | 290/52 |
| 5,864,770 A | 1/1999 | Ziph et al. | |
| 5,946,941 A | 9/1999 | Sinelnikov | |
| 5,966,925 A | 10/1999 | Torikai et al. | |
| 5,989,156 A | 11/1999 | Matsubara et al. | |
| 6,068,452 A | 5/2000 | Okada et al. | |
| 6,070,429 A | 6/2000 | Low et al. | |
| 6,096,839 A | 8/2000 | Chinh et al. | |
| 6,221,130 B1 | 4/2001 | Kolodziej et al. | |
| 6,225,706 B1 | 5/2001 | Keller | |
| 6,324,867 B1 | 12/2001 | Fanning et al. | |
| 6,349,551 B1 | 2/2002 | Jirnov et al. | |
| 6,354,318 B2 | 3/2002 | Butler | |
| 6,367,286 B1 | 4/2002 | Price | |
| 6,390,114 B1 | 5/2002 | Haandrikman et al. | |
| 6,393,867 B1 | 5/2002 | Guillard | |
| 6,446,465 B1 | 9/2002 | Dubar | |
| 6,463,740 B1 * | 10/2002 | Schmidt et al. | 60/772 |
| 6,474,950 B1 | 11/2002 | Waldo | |
| 6,484,490 B1 | 11/2002 | Olsen et al. | |
| 6,524,059 B1 | 2/2003 | Nogiwa | |
| 6,604,850 B1 | 8/2003 | Schneider et al. | |
| 6,606,860 B2 | 8/2003 | McFarland | |
| 6,640,586 B1 * | 11/2003 | Baudat et al. | 62/612 |
| 6,658,891 B2 | 12/2003 | Reijnen et al. | |
| 6,691,531 B1 | 2/2004 | Martinez et al. | |
| 6,724,098 B2 | 4/2004 | Ortega et al. | |
| 6,724,099 B2 | 4/2004 | Klaar | |
| 6,732,529 B2 | 5/2004 | Anderson | |
| 6,750,557 B2 | 6/2004 | Poteet et al. | |
| 6,782,982 B2 | 8/2004 | Wahl et al. | |
| 6,838,779 B1 | 1/2005 | Kandil et al. | |
| 6,860,726 B2 | 3/2005 | Carter, III et al. | |
| 6,913,437 B2 * | 7/2005 | Vogelsang et al. | 415/66 |
| 6,923,180 B2 | 8/2005 | Richey et al. | |
| 7,080,793 B2 | 7/2006 | Borisov et al. | |
| 7,131,275 B2 | 11/2006 | Gustafson | |
| 7,198,142 B2 | 4/2007 | Wahl et al. | |
| 7,239,967 B2 | 7/2007 | Havre | |
| 7,413,399 B2 | 8/2008 | Trewin | |
| 7,428,818 B2 | 9/2008 | Hjerpe | |
| 7,526,926 B2 | 5/2009 | Rasmussen et al. | |
| 7,582,134 B2 | 9/2009 | Hampden-Smith et al. | |
| 7,717,181 B2 | 5/2010 | Bullen | |
| 7,857,059 B2 | 12/2010 | Shen et al. | |
| 7,988,435 B2 | 8/2011 | Fujimoto et al. | |
| 8,025,100 B2 | 9/2011 | Dehaene et al. | |
| 8,281,820 B2 | 10/2012 | White | |
| 8,381,617 B2 | 2/2013 | Holt et al. | |
| 2001/0004830 A1 | 6/2001 | Wakana et al. | |
| 2002/0028145 A1 | 3/2002 | Samurin | |
| 2002/0067042 A1 | 6/2002 | Alvarez Orgega et al. | |
| 2002/0077512 A1 * | 6/2002 | Tendick et al. | 568/959 |
| 2002/0104697 A1 | 8/2002 | Hatanaka | |
| 2002/0114985 A1 | 8/2002 | Shkolnik et al. | |
| 2003/0052485 A1 | 3/2003 | Poteet et al. | |
| 2003/0074900 A1 | 4/2003 | McFarland | |
| 2006/0245937 A1 | 11/2006 | Goodwin et al. | |
| 2007/0028984 A1 | 2/2007 | Caro et al. | |
| 2007/0060442 A1 | 3/2007 | Ransbarger et al. | |
| 2008/0219834 A1 | 9/2008 | Merfeld et al. | |
| 2009/0149969 A1 | 6/2009 | Slupphaug et al. | |

FOREIGN PATENT DOCUMENTS

| | | |
|---|---|---|
| EP | 0330555 | 8/1989 |
| EP | 0529307 | 3/1993 |
| EP | 0529307 A1 | 3/1993 |
| EP | 0781948 | 7/1997 |
| EP | 0963035 A2 | 12/1999 |
| EP | 0963095 | 12/1999 |
| GB | 24349 A | 0/1915 |
| GB | 1208831 | 10/1970 |
| GB | 1530842 | 11/2008 |
| WO | WO96/00604 | 1/1996 |
| WO | WO99/02863 | 1/1999 |
| WO | WO02/12692 A1 | 2/2002 |
| WO | WO2006/042866 | 4/2006 |
| WO | WO2007/078418 | 7/2007 |
| WO | WO2007/102964 A2 | 9/2007 |
| WO | WO2008/015224 | 2/2008 |
| WO | WO2009/117787 | 10/2009 |

OTHER PUBLICATIONS

F. Kleiner, S. Rausch, and J. Knabe, "Increase power and efficiency of LNG refrigeration compressor drivers", Hydrocarbon Processing, Jan. 2003, pp. 67-69.

Meissner Bolte & Partners, Civil Action No. 1347/05LH between Voith Turbo GmbH & Co. KG and Phillips Petroleum Company, Dec. 19, 2005, 20 pages.

Voith Turbo, Compressor Starting Torque Converter Vosycon, product brochure 6 pages.

European Search Report No. 113572, May 10, 2006, 4 pages.

International Search Report and Written Opinion, mailed Jan. 17, 2008, 9 pages.

Atlas Copco (2007) "*Atlas Copco Compressors for PET blowing P-series high pressure oil-free piston compressors,*" Brochure [online] www.machonko.poznan.pl/gfx/PET-compressors.pdf, 11 pgs.

Kompressoren, Bauer (2008) "*Bauer Kompressoren The New Poseidon Edition,*" Brochure [online] www.bauer-kompressoren.de/pdf/produkte/pe_edition_320-680_feuerwehr_en.pdf, 4 pgs.

Hallock, D.C., et al. (1972) "Compressors & Drivers For LNG Plants", *Chemical Engineering Process*, vol. 68(9), pp. 77-82.

Hobi, Joseph (1996), "Technologies Des Moteurs Electriques A Vitesse Variable", *Petrole et Techniques*, No. 403, 7 pages.

Kleiner, F., et al. (2003), "Increase power and efficiency of LNG refrigeration compressor drivers", Hydrocarbon Processing, pp. 67-69.

Piekert, G.H., et al. (1996), "Use of Modern Multi-Stage Variable Speed Drives For the Drive of Gas Compressors In PTT's (Petroleum Authority of Thailand) Gas Separating Plant No. 3 and Parallel Gas Pipeline", *Oil Gas—European Magazine*, pp. 22, 24-25.

Pillarella, M. et al. The C3MR Liquefaction Cycle: Versatility for a Fast Growing, Ever Changing LNG Industry, *Paper PS2-5*, 14 pages.

Roberts, M. H. et al. (2008) "Equipment and Machinery Advances Herald Next Generation of LNG Processes," *LNG Journal Online*, 11 pages.

Siahaan, H. B. et al. (2005) "Suppressing Riser-Based Slugging in Multiphase Flow by State Feedback," *44th IEEE Conference*, Seville, Spain, Dec. 12-15, 2005, pp. 452-457.

Tanaka, H. (1993), "AC Drive Replacing and Fusing With Machine Power Sources", *Sho-Enerugi*, vol. 45(11), pp. 24-28.

Wahl, G. et al., (1990), "Torque Converter Used As Gas Turbine Starting Device—Stage of Development and Parameters", *4th International Symposium on Gas Turbines In Congeneration, Repowering and Peak Load Power Generation*, ASME, International Gas Turbine Institute, vol. 5, pp. 165-172.

Wilkes, M. et al. "Large Capacity LNG Trains: Focus on Improving Plant Operability During the Design Stage," *Poster PO-32*, 8 pages.

\* cited by examiner

MULTI-COMPRESSOR STRING WITH MULTIPLE VARIABLE SPEED FLUID DRIVES

CROSS REFERENCE TO RELATED APPLICATIONS

This application is the National Stage of International Application No. PCT/US06/43287, filed 8 Nov. 2006, which claims the benefit of U.S. Provisional Application No. 60/753,717, filed 23 Dec. 2005.

This application is related to U.S. Provisional Patent Application No. 60/779,680, entitled "Dual End Gear Fluid Drive Starter," filed 6 Mar. 2006 by Christopher G. Holt and William L. Martin.

BACKGROUND OF THE INVENTION

1. Field of the Invention

This invention generally concerns starters for large rotating equipment. More specifically, it concerns a variable speed fluid drive (torque converter) starter for a string of rotating equipment that includes multiple high load compressors. The fluid drive starter is an alternative device for starting either a large motor or turbine to drive a compressor(s) or other rotating machinery based load.

2. Discussion of Background Information

Combinations of high speed, high power rotating equipment, known as strings, require starting mechanisms to initiate operation. A typical string in a facility may have a gas turbine or motor driver connected to a compressor, multiplicity of compressors, generator, or another rotating machinery based load. A starter mechanism such as a low power starting motor may also be connected to the string. FIG. 1 shows an example of a string with a gas turbine mechanical drive and compression load with a variable frequency drive (VFD) 1 with starter motor 2. The VFD 1 is an electric device that inverts fixed AC line input voltage to DC and converts DC voltage to user-defined output AC. The VFD produces a user selectable frequency output, thereby providing variable speed for the motor. As a result, large inertial loads are started with limited (controlled) in-rush current as opposed to across-the-line starts in synchronous motors with damper bars which may draw up to 6 times (load dependent) the motor rated current (continuous duty current). FIG. 2 schematically illustrates an across-the-line starter motor (S/M) 3 with a variable speed hydraulic clutch (HC) 4. The across-the-line starter motor with HC is another mechanism for starting large inertial loads. The HC operates as a mechanical VFD. The across-the-line starter motor is started with the HC disengaged. Once the motor is at full speed, the HC is engaged providing variable speed (zero to full speed) and necessary torque to bring the gas turbine and other connected load(s) to full speed. Once the gas turbine achieves sufficient speed to produce power, the hydraulic clutch is disengaged and the starter motor is electrically removed from service.

Starting a string may be achieved under one of two primary conditions. The first condition is depressurized start, and the second is pressurized start. A depressurized start initiates at a low settle-out pressure within the compressor(s). For a depressurized start, the working gas is removed from the compressor(s). This gas must be replaced. The method for replacement is known as gas make-up. Gas make-up may require extra facility hardware (valves, piping, transmitters, flares, gas reclamation, and associated controls) and is a time consuming effort. Due to a lengthy time requirement and extra facility cost to make-up gas in a depressurized start, pressurized start is an attractive alternative. A pressurized start initiates with a high settle-out pressure within the compressor(s) when compared to depressurized start. A pressurized start removes necessary hardware associated with gas make-up in depressurized starts. However, a pressurized start requires additional starting power due to higher starting torque.

There are two types of turbines employed in mechanical drive service, dual-shaft and single-shaft. Dual-shaft gas turbines produce compressed air for the combustion process with a compressor driving a short stage turbine on a single shaft. The remaining thermodynamic power in the form of pressure, temperature, and mass flow is routed directly into the coaxial power turbine on a second shaft. The advantage of a dual-shaft gas turbine is the ability to produce significant power (torque) across the turbine's speed range. However, as compressor string power requirements have increased, the demand for larger power gas turbines has also increased. To meet these power requirements, users have adapted single shaft gas turbine technology (traditionally used in power generation) for mechanical drive service. In addition to gas turbine mechanical drives, motors are also used as compressor prime movers. These large motors are conventionally driven by VFDs.

For large motors under a pressurized start, across the line starting is not possible. Variable frequency drives as in FIG. 1 are a necessity. In a typical example, four compressors in a string are required to be started. Each compressor requires 30 MW at 3,000 rpm at operating design point. These compressors require a total of 120 MW to operate. In this example, it is assumed that the pressurized start requires all 120 MW to start the string. With present technology (VFD), it is costly to start with full pressure. The string would require a depressurized start and/or compressor suction throttling resulting in starting power at full speed to be less than 75 MW. A turbine drive capable of meeting the 120 MW power requirements is necessary. Turbines of this size are incapable of producing significant power at speeds below 97% of full rated speed and are insufficient for starting. The string requires a starter/helper motor and VFD to provide the necessary starting power for the string. After the string achieves full speed at motor maximum or near maximum power, the turbine will apply the remaining power to achieve 120 MW. At this point, starting power from the motor is no longer required.

However, a VFD is a large capital expense and may contribute up to 70% of the cost in a motor/VFD package. A mechanical alternative to starting a string uses a variable speed fluid drive between the turbine or motor and the compressors. A variable speed fluid drive (VSFD) is a constant speed input, variable speed output, device that transmits power (torque) from the input shaft to the output shaft via a fluid (hydraulic) coupling. A more common name for a variable speed fluid drive is a compressor starting torque converter (CSTC). The term CSTC will be used throughout this application specifically and interchangeably to refer to variable speed fluid drive torque converters. U.S. Pat. No. 6,463,740, issued Oct. 15, 2002 to Schmidt, et al. ("Schmidt") is an example of a known CSTC.

FIG. 3 depicts a known drive having a prime mover (see, for example, Schmidt) which may be a gas turbine or electric motor, with a CSTC 5. The CSTC eliminates the need for a VFD in a motor driven string and eliminates the need for a starter/helper motor and VFD in a gas turbine driven string. However, a starter motor with a hydraulic clutch is required in either case to start the prime mover. While FIG. 3 specifically shows two compressors, Schmidt discloses the use of at least one compressor.

Power to speed performance of the CSTC is limited. In the related application of the current inventors, U.S. Provisional No. 60/779,680 referred to above, the power to speed dilemma is addressed using a gear train to enable the CSTC to operate at a lower speed which can be increased to match the speed of the turbine or motor. But, certain applications having multiple compressors require more power at a given speed than a single CSTC can support. In the example discussed above, current VSFD technology at 3,000 rpm can only start up to 30 MW. After the synchronous speed lock up mechanism is engaged, it may transfer up to 130 MW. With these power limits, a single CSTC cannot start the multiple compressors in the string.

In a depressurized start, where the loads in a compressor string are reduced, a CSTC may be capable of performing a start. However, for pressurized starts in high-load, multiple compressor strings the power of a single CSTC is often insufficient to start multiple compressors. The present invention seeks to mitigate this shortcoming.

SUMMARY OF THE INVENTION

This invention relates to a mechanical technique to start a string. More specifically, embodiments of the invention relate to the integrated application of multiple CSTC's as a starting package for multiple compressors on a single string.

A particular use for the invention is in LNG refrigeration service where several compressors on a single string require a high power prime mover for continuous duty. The compressors are used to compress a refrigerant which is then used in cooling natural gas to a liquid state. A typical arrangement is for a liquefied natural gas refrigeration multiple compressor string that may require 150 MW of power at 3000 rpm or 3600 rpm. In LNG refrigeration service, a pressurized start is most efficient. However, additional machinery is required to start the compressors, including starter/helper motors and VFDs. When this invention is employed with a single-shaft gas turbine mechanical drive for a string of refrigeration compressors in LNG service, a starter/helper motor and a VFD can be eliminated and replaced by multiple CSTC variable fluid drives. Equally, when this invention is employed with a motor mechanical drive for a string of refrigeration compressors in LNG service, a VFD can be eliminated and replaced by multiple CSTC variable fluid drives.

In a particular arrangement, four compressors in the string are each started by a CSTC. With this arrangement, the power requirements for each compressor can be met by the individual CSTCs, successively. The method first starts the prime mover turbine or motor using either a starter motor and starter motor hydraulic clutch or starter motor and starter motor VFD, then varies the output speed of a first CSTC from zero to full lock-up speed to start the first compressor. Successive CSTCs are brought up to speed individually, in turn, to start the successive compressors.

In other arrangements, depending on the power requirements of the compressors and the power and speed capability of the CSTCs, a single CSTC may power up a pair of compressors. A string may include both a single CSTC per compressor and a single CSTC for multiple compressors with at least two CSTCs in a string.

The present invention also recognizes the need to cool the working fluid of the CSTCs, and includes a heat exchanger for this purpose. In particular, a single heat exchanger is connected to cool the working fluid of the plurality of CSTCs.

In another arrangement, a single heat exchanger is used to cool the working fluid for more than one string, each having multiple CSTCs and compressors.

Other objects, characteristics and advantages of the present invention will be apparent on reading the following description of various embodiments of the invention, including methods of using the apparatus, which are given as non-restricting examples in reference to the attached drawings.

BRIEF DESCRIPTION OF THE DRAWINGS

It should be noted that the drawings presented below are not shown to scale and that size and thickness of the various elements have been chosen to facilitate a better understanding of the drawings. The present invention is further described in the detailed description which follows, in reference to the noted plurality of drawings by way of non-limiting examples of embodiments of the present invention, in which like reference numerals represent similar parts throughout the several views of the drawings, and wherein.

DETAILED DESCRIPTION OF THE PRESENT INVENTION

Figure 1:
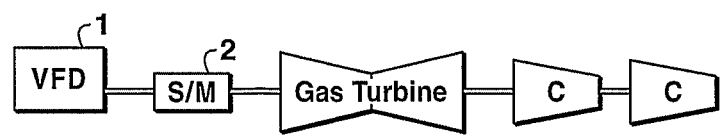
FIG. 1 is a schematic view of a known equipment string using a variable frequency drive.
Figure 2:
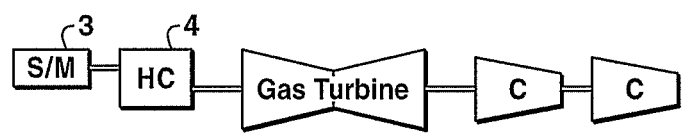
FIG. 2 is a schematic view of another known equipment string that uses a variable speed hydraulic clutch and a starter motor.
Figure 3:
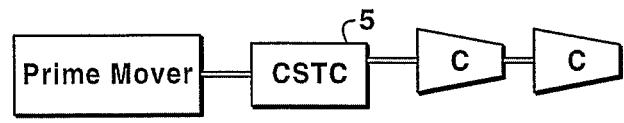
FIG. 3 is a schematic of a known string as in FIG. 2 but using a CSTC intermediate the prime mover and compressors.

In accordance with various aspects of the present invention, there is provided a compressor starting arrangement for a string of rotating equipment. The string includes a prime mover and a plurality of compressors to be driven by the prime mover. The starting arrangement comprises a first variable speed fluid drive torque converter interposed in the string after the prime mover and before a first compressor and a second variable speed fluid drive torque converter interposed in the string before a second of the compressors, whereby the first and the second compressors are started by the first and second variable speed fluid drive torque converters.

The prime mover according to the invention may be a gas turbine or an electric motor. The turbine may be a single shaft gas turbine. Additionally, the starting arrangement may further include a starter motor and a hydraulic clutch or a starter motor and a starter motor VFD for initiating operation of the turbine. Each of the first variable speed fluid drive torque converter and the second variable speed fluid drive torque converter may be a compressor starting torque converter that uses a working fluid to transmit power from zero output to a lock-up speed at which point the input speed is synchronized to output speed. The compressors may or may not be pressurized at start-up.

According to another aspect of the invention, the starting arrangement may comprise a third compressor and a fourth compressor. Additionally, the arrangement may further comprise a third variable speed fluid drive torque converter and a fourth variable speed fluid drive torque converter, wherein each of the first, second, third and fourth torque converters is interposed before each of the first, second, third and fourth compressors, respectively. Additionally, the arrangement may further comprise a fifth compressor in the string connected directly with one of the first, second, third, or fourth compressors, such that a single torque converter starts one of the compressors and the fifth compressor.

According to yet another aspect of the invention, the compressor starting arrangement further comprises at least one heat exchanger supplied with an external cooling fluid for cooling the working fluid. The working fluid of the first and the at least second torque converters may be transmitted through a single heat exchanger. Each of the torque converters may be connected to a single heat exchanger by a discharge conduit including a discharge valve. A supply valve may be inserted in a supply conduit to each of the torque converters.

The discharge conduit for each of the torque converters may be connected to a common hot manifold, the hot manifold being connected to the single heat exchanger. The supply conduit for each of the torque converters may be connected to a common cold manifold, the cold manifold being connected to a single heat exchanger.

In accordance with one or more embodiments of the invention, there is provided a heat exchanger system for use with a plurality of variable speed hydraulic torque converters in a rotating equipment power string, the torque converters utilizing a hydraulic working fluid, wherein the system comprises a single heat exchanger including an external supply of cooling fluid and each of the torque converters includes a supply conduit for cooled working fluid, and a discharge conduit for the heated working fluid. The supply conduit and said discharge conduit for each of the torque converters is connected to a single heat exchanger, whereby the working fluid for multiple torque converters can be cooled by a single heat exchanger.

According to a further aspect of the invention, the heat exchanger system comprises for each of the plurality of torque converters, a discharge valve in each of the discharge conduits, whereby each of the torque converters may be isolated from the single heat exchanger. Additionally, a supply valve may be placed in each of the supply conduits, whereby each of the torque converters can be isolated from the single heat exchanger.

A hot manifold may be connected to the heat exchanger, wherein the discharge conduits for each of the plurality of torque converters may be connected to the hot manifold.

A cold manifold may be connected to receive cooled working fluid from the heat exchanger, wherein the supply conduits for each of the variable speed torque converters may be connected to the cold manifold.

Yet further, for each of the plurality of torque converters, there may be provided a cold manifold, the cold manifold being connected to receive cooled working fluid from the heat exchanger, wherein the supply conduits for each of the variable speed torque converters are connected to the cold manifold. A hot manifold may be provided for each of the plurality of torque converters, the hot manifold being connected to the heat exchanger, wherein the discharge conduits for each of the plurality of torque converters are connected to the hot manifold. A discharge valve may be placed in each discharge conduit, whereby the working fluid discharged form each of the torque converters can be isolated from the single heat exchanger. A supply valve may be placed in each of the supply conduits, whereby each of the torque converters can be isolated from the cooled working fluid from the single heat exchanger.

The heat exchanger system according to the invention may further comprise a pump for circulating working fluid through the single heat exchanger. The string may include a turbine and multiple compressors. Additionally, the heat exchanger system may comprise a second string of rotating equipment including a plurality of variable speed fluid torque converters, wherein each of the torque converters of the second string are connected to the single heat exchanger.

Further embodiments of the invention contemplate a method for starting a string of rotating power equipment including a prime mover driving multiple compressors, and multiple variable speed fluid torque converters for starting at least a first of the compressors followed by other torque converters starting other compressors, in succession, the prime mover being connected to a first variable speed fluid drive torque converter, and the first torque converter being connected to the first compressor, and at least a second torque converter being connected to the first compressor and in turn connected to a second of the compressors, each of the torque converters providing an output from zero to full speed. The method comprises starting the prime mover and bringing it to full speed, starting the first compressor by increasing the output speed of the first torque converter to full speed, and starting the second compressor by increasing the output speed of the at least second torque converter to full speed, whereby the power necessary to start each compressor is supplied successively and in turn by each torque converter.

According to other embodiments of the invention, there may be included a third and a fourth compressor and third and fourth torque converters, wherein the method further comprises increasing the speed of the third torque converter to full speed and starting the third compressor and increasing the speed of the fourth torque converter to full speed to start the fourth compressor.

According to another aspect of the invention, a third compressor may be included, wherein increasing the output speed of the second torque converter starts the second and third compressors.

Each torque converter may include a lock-up mechanism engaged at full speed, whereby all power is transmitted mechanically and an input and output speed is synchronized, and wherein the method includes locking up each of the torque converters at full speed successively to enable full power transmission.

The prime mover may be a turbine and the string may include a starter motor and a hydraulic clutch connected to the turbine, wherein starting the turbine includes starting the starter motor and engaging the hydraulic clutch. Alternatively, the prime mover may be a motor and the string may include a starter motor and a starter variable frequency drive (VFD) connected to the starter motor, wherein starting the motor may include starting the starter motor with the variable frequency drive. It will be understood that in embodiments of the invention, the combination of starter VFD and starter motor may be used to start either a gas turbine or a motor. It will also be understood that in embodiments of the invention, the combination of a starter motor and a hydraulic clutch may be used to start a gas turbine or a motor.

According to a further aspect of the invention, there is provided a method of cooling the working fluid of multiple variable speed hydraulic torque converters in a string of rotating power equipment including a prime mover driving multiple compressors, and multiple variable speed fluid torque converters for starting at least one of the compressors followed by other torque converters starting other compressors, in succession, the prime mover being connected to a first variable speed fluid drive torque converter, and the first torque converter being connected to a first compressor, and at least a second torque converter connected to the first compressor and in turn connected to a second of the compressors, each of the torque converters providing an output from zero to full speed, each of the torque converters including a supply conduit for cooled working fluid, and a discharge conduit for the heated working fluid, the supply conduit and the discharge conduit for each of the torque converters being connected to a single heat exchanger, and including a discharge valve in each of the discharge conduits and a supply valve in each of the supply conduits. The method comprises starting the prime mover, opening the supply and discharge valves of the first torque converter while keeping all other valves to the second torque converter closed to permit the working fluid to flow through the first converter and the single heat exchanger, starting the first compressor and increasing the speed up to full speed, closing the supply and discharge valves to the first torque converter, opening the supply and discharge valves to the second torque converter while keeping all other valves closed to permit the working fluid to flow through the second torque converter and the single heat exchanger, starting the second compressor and increasing its speed to full speed, and closing the supply and discharge valves to the second torque converter, whereby each of the torque converters can be successively isolated from the single heat exchanger in turn.

The first and the at least a second torque converter may have different cooling needs, the method according to the invention, further comprising providing a heat exchanger with a capacity to satisfy the greater cooling needs.

The heat exchanger may be supplied with working fluid from a hot manifold and discharge working fluid to a cold manifold, the method, according to the invention, further comprising supplying working fluid through the discharge valves to the hot manifold, and supplying fluid through the supply valves from the cold manifold to each torque converter.

A third and a fourth compressor and third and fourth torque converters may be added, wherein the method according to the invention further comprises opening the supply and discharge valves to the third torque converter while keeping all other valves closed to permit the working fluid to flow through the third torque converter and the single heat exchanger, starting the third compressor and increasing the speed up to full speed, closing the supply and discharge valves to the third torque converter, opening the supply and discharge valves to the fourth torque converter while keeping all other valves closed to permit the working fluid to flow through the fourth torque converter and the single heat exchanger, and starting the fourth compressor and increasing its speed to full speed.

A second string of equipment may be provided, the second string including a plurality of variable speed fluid torque converters and a plurality of compressors, wherein the method according to the invention, comprises providing the torque converters of the second string with supply and discharge conduits for the working fluid and connecting the supply and discharge conduit to the single heat exchanger, whereby the single heat exchanger is usable by more than one string of equipment.

Each torque converter may include a lock-up mechanism, engaged at full speed, whereby all power is transmitted mechanically and the input and output speed is synchronized, the method according to the invention, further comprising locking up each of the torque converters at full speed, successively, to enable full power transmission mechanically such that working fluid is no longer required. The prime mover discussed above may be a turbine or a motor.

According to yet another aspect of the invention, there is provided a compressor starting arrangement for a string of rotating equipment, the string including one of, a turbine or a motor, and a plurality of pressurized compressors to be driven by the one of, a turbine or a motor, the arrangement comprising a starter motor and a hydraulic clutch or a starter motor VFD for initiating operation of the one of, a turbine or a motor. A first variable speed fluid drive torque converter is interposed in the string after the one of, a turbine or a motor, and before a first compressor, a second variable speed fluid drive torque converter is interposed in the string before a second compressor, a third variable speed fluid drive torque converter is interposed in the string before a third compressor, and a fourth variable speed fluid drive torque converter is interposed in the string before a fourth compressor. Each of the variable speed fluid drive torque converters comprises a compressor starting torque converter that uses a working fluid to transmit power from zero output to a lock-up speed at which point the input speed is synchronized to output speed and the power is transmitted mechanically, a single heat exchanger including an external supply of cooling fluid, and a pump for circulating the working fluid through the heat exchanger. Each of the torque converters includes a supply conduit for cooled working fluid, and a discharge conduit for the heated working fluid, a cold manifold being connected to receive cooled working fluid from the heat exchanger, wherein the supply conduits for each of the variable speed torque converters are connected to the cold manifold, a hot manifold being connected to the heat exchanger, wherein the discharge conduits for each of the plurality of torque converters are connected to the hot manifold, a discharge valve in each of the discharge conduits, whereby the working fluid discharged from each of the torque converters can be isolated from the single heat exchanger, and a supply valve in each of the supply conduits, whereby each of the torque converters can be isolated from the cooled working fluid from the single heat exchanger, whereby the compressors are started by the variable speed fluid drive torque converters successively and in turn, and the working fluid for multiple torque converters is cooled by a single heat exchanger.

According to a further aspect of the invention, a method is provided for manufacturing liquefied natural gas using rotating power equipment including a prime mover driving multiple compressors, the compressors compressing a refrigerant, the compressed refrigerant being used to cool natural gas to a liquid state, and multiple variable speed fluid torque converters for starting at least a first of the compressors followed by other torque converters starting other compressors, in succession. The prime mover is connected to a first variable speed fluid drive torque converter, the first torque converter being connected to the first compressor, and at least a second torque converter being connected to the first compressor and in turn connected to a second of the compressors, each of the torque converters providing an output from zero to full speed. The method comprises starting the prime mover and bringing it to full speed, starting the first compressor by increasing the output speed of the first torque converter to full speed, and starting the second compressor by increasing the output speed of the at least second torque converter to full speed, whereby the power necessary to start each compressor is supplied successively and in turn by each torque converter.

The particular structure and method of using the certain embodiments of the invention are discussed below.

Figure 4A:
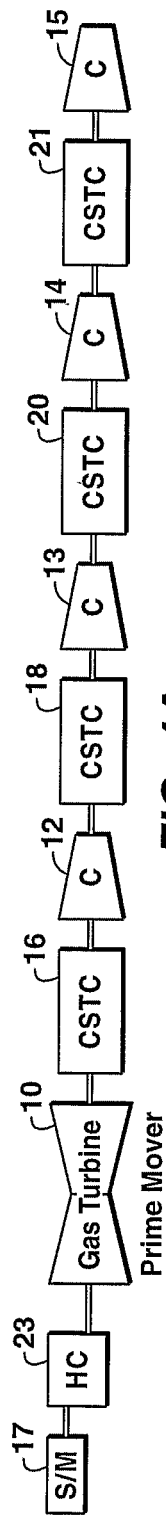
FIG. 4A is a schematic diagram of a first embodiment of the multi-compressor string with multiple fluid drive starters.
Figure 4B:
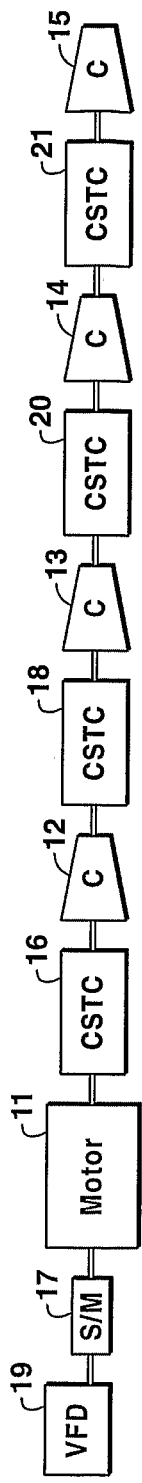
FIG. 4B is a schematic diagram similar to FIG. 4A, but showing a second embodiment.

FIG. 4A schematically shows a power string that includes a gas turbine 10 that is utilized to drive a plurality of compressors 12, 13, 14, 15 (a motor could be used in place of the gas turbine). While FIG. 4A shows four compressors, embodiments of the present invention may employ as many compressors as the machinery can physically handle. Referring again to FIG. 4A, a starter motor 17 is connected by a hydraulic clutch 23 to the turbine. A similar string using a motor 11 is shown in FIG. 4B. In FIG. 4B, the motor is started using a variable frequency drive (VFD) 19, or a hydraulic clutch, and a starter motor. The output of the turbine 10 or motor 11 is connected to the input of a first CSTC 16. The output of the CSTC is connected to the first compressor 12. The first compressor output is connected to the second compressor 13 by a second CSTC 18. Similarly, CSTCs 20 and 21 are placed intermediate the last two compressors 14 and 15. In one or more embodiments, the turbine in FIG. 4A is rated at 120 mega watts (MW) and each of the compressors require 30 MW.

The CSTCs 16, 18, 20 and 21 are variable fluid drive torque converters that are capable of transmitting power from zero to a lock up speed. A lock-up mechanism is used to transmit power mechanically, directly from the input to the output at full speed. The details of such torque converters are disclosed specifically in U.S. Pat. No. 6,463,740 to Schmidt et al issued Oct. 15, 2002, the entire disclosure of which is hereby incorporated by reference.

The method to start the string with four CSTCs is as follows:

1. Start turbine 10 or motor 11 (full speed);
2. CSTC 16 starts the first compressor 12 (nearest to turbine). After the first compressor is at full speed, the synchronous speed lock up mechanism is engaged to enable full power transmission through CSTC 16;
3. CSTC 18 starts the second compressor 13. After the second compressor is at full speed, the synchronous speed lock up mechanism is engaged to enable full power transmission through CSTC 18;
4. CSTC 20 starts third compressor 14. After the third compressor is at full speed, the synchronous speed lock up mechanism is engaged to enable full power transmission through CSTC 20; and
5. CSTC 21 starts the fourth compressor 15. After the fourth compressor is at full speed, the synchronous speed lock up mechanism is engaged to enable full power transmission through CSTC 21. The start is then complete.

Figure 5:
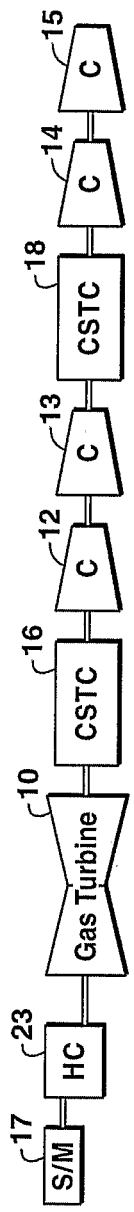
FIG. 5 is a schematic diagram showing multiple CSTCs starting multiple compressors.
Figure 6:
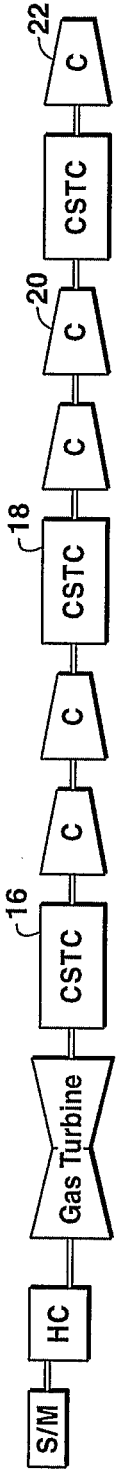
FIG. 6 is a schematic view showing a string with five compressors.

Depending on the particular requirements of the compressors, other arrangements of CSTCs and compressors can be used. In FIG. 5, an arrangement is shown where four compressors 12, 13, 14, 15 are started in turn by two CSTCs 16 and 18. In FIG. 6, a third CSTC 20 is necessary to help start a fifth compressor 22. Similar to the starting method for the arrangement of FIG. 4A, the CSTCs of FIGS. 5 and 6 are started sequentially, bringing each compressor or compressors up to full power and speed at CSTC lock-up.

The variable fluid drive CSTC has internal components that act as a variable displacement pump to move hydraulic fluid to a turbine impeller. As the pump displacement is varied, the impeller increases in speed from zero to its full lock-up speed. Energy losses occur in the working fluid as the pump imparts work to the working fluid and as the working fluid imparts work to the turbine impeller. These losses translate into heat, and the working fluid must be cooled. A heat exchanger is used to cool the working fluid.

Each CSTC may have its own heat exchanger. However, a single heat exchanger for multiple CSTCs is shown schematically in FIG. 7. For a compressor string start-up of four compressors and four CSTCs, a similar size CSTC for all four applications may be used since each compressor requires similar power. The string is started in stages. A single CSTC is operated as a variable speed device at any time during start-up, thus only one heat exchanger is necessary for all four CSTCs. In a case where different sized CSTCs are used, a single heat exchanger rated for the highest power CSTC may be selected for all CSTCs. The heat exchanger arrangement shown is applicable to a string using either a turbine or motor prime mover, as shown in FIG. 4A or 4B, respectively.

Figure 7:
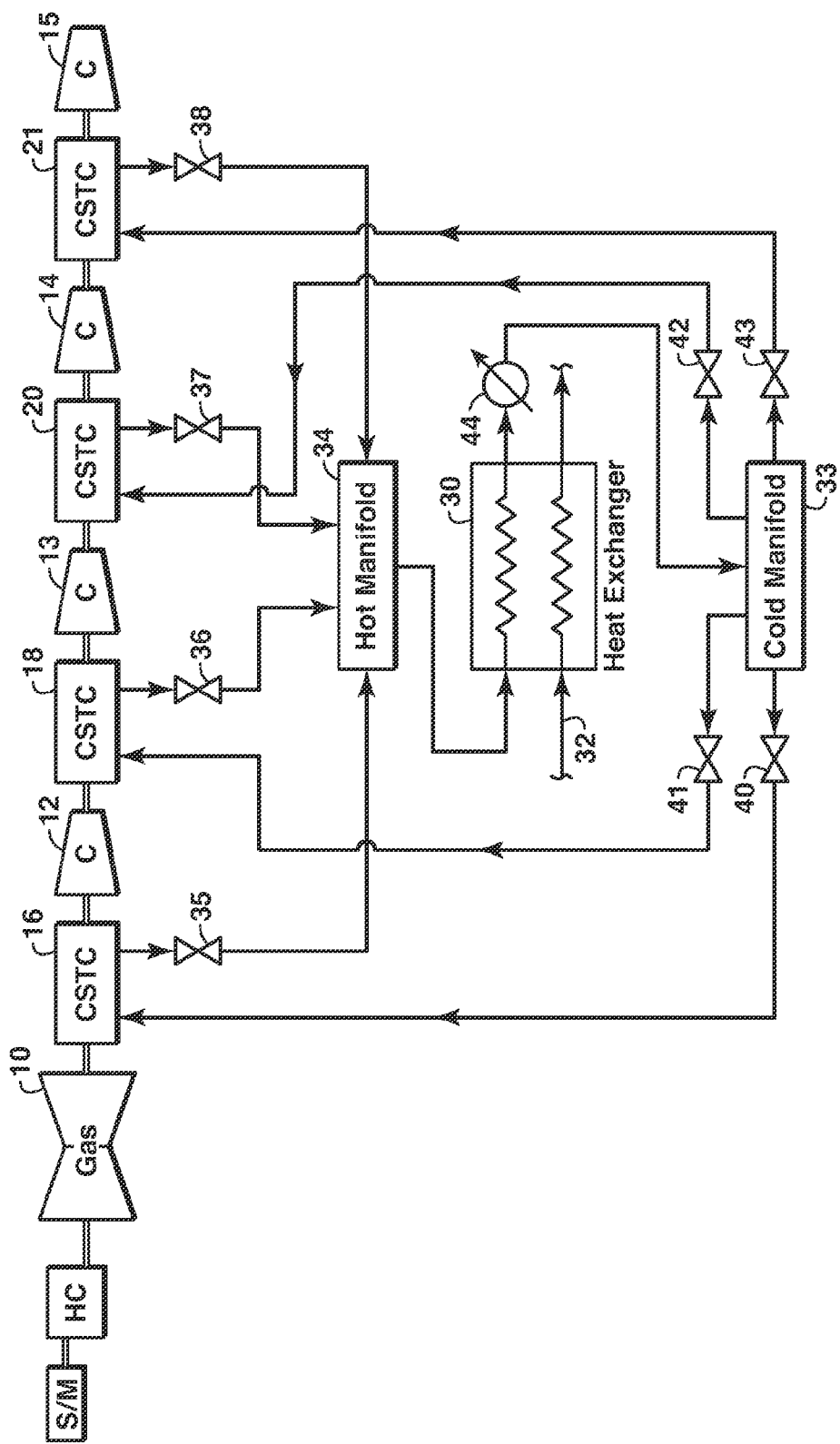
FIG. 7 is a schematic diagram of the heat exchanger used with multiple CSTCs in a string.

As shown in FIG. 7, the heat exchanger is supplied externally with a cooling medium 32. The working fluid of each CSTC is supplied from a cold manifold 33 and is discharged to a hot manifold 34. The working fluid conduits for CSTC 16 include a discharge valve 35 and a supply valve 40, to isolate the CSTC from the heat exchanger. Similarly, CSTCs 18, 20 and 21 are connected to the hot manifold 34 by valves 36, 37, and 38, respectively. The working fluid supplied to successive CSTCs 18, 20 and 21 is controlled by valves 41, 42, and 43, respectively. A pump 44 may be included to circulate the working fluid through the heat exchanger 30.

Using a small starter motor 17 with either a hydraulic clutch 18 (FIG. 4A) or a starter motor VFD 19 (FIG. 4B) the turbine 10 or motor 11 is started, and at full speed the start process for all compressors begins. The following list details the start of a compressor string with multiple CSTCs, multiple compressors, and a single heat exchanger for all CSTCs.

1. CSTC 16 starts the first compressor. Valves 35 and 40 are fully opened to permit flow to circulate through CSTC 1 and the heat exchanger. All other valves are closed.
2. CSTC 16 and compressor 12 are at full speed. CSTC 16 lock up mechanism engages to permit rigid rotation between CSTC 16 input and output shafts and to enable maximum throughput torque transmission of CSTC 16. Valves 35 and 40 are closed and all working fluid in CSTC 16 is drained. CSTC 18 starts the second compressor 13. Valves 36 and 41 are fully opened to permit flow to circulate through CSTC 18 and the heat exchanger. All other valves remain closed.
3. CSTC 16 and compressor 12, CSTC 18 and compressor 13 are at full speed. CSTC 18 lock up mechanism engages to permit rigid rotation between CSTC 18 input and output shafts and to enable maximum throughput torque transmission of CSTC 18. Valves 36 and 41 are closed and all working fluid in CSTC 18 is drained. CSTC 20 starts the third compressor 14. Valves 37 and 42 are fully opened to permit flow to circulate through CSTC 20 and the heat exchanger. All other valves remain closed.
4. CSTC 16 and compressor 12, CSTC 18 and compressor 13, CSTC 20 and compressor 14 are at full speed. CSTC 20 lock up mechanism engages to permit rigid rotation between CSTC 20 input and output shafts and to enable maximum throughput torque transmission of CSTC 20. Valves 37 and 42 are closed and all working fluid in CSTC 20 is drained. CSTC 21 starts the fourth compressor 15. Valves 38 and 43 are fully opened to permit flow to circulate through CSTC 21 and the heat exchanger. All other valves remain closed.
5. All CSTCs and compressors are at full speed and load. CSTC 21 lock up mechanism engages to permit rigid rotation between CSTC 21 input and output shafts and to enable maximum throughput torque transmission of CSTC 21. Valves 38 and 43 are closed and all working fluid in CSTC 21 is drained. All other CSTCs' valves remain closed.

Any arrangement of CSTCs (as described previously in FIGS. 5 and 6) on a single string may have a single heat exchanger per CSTC decreasing to a minimum of one heat exchanger for all CSTCs on the string.

Figure 8:
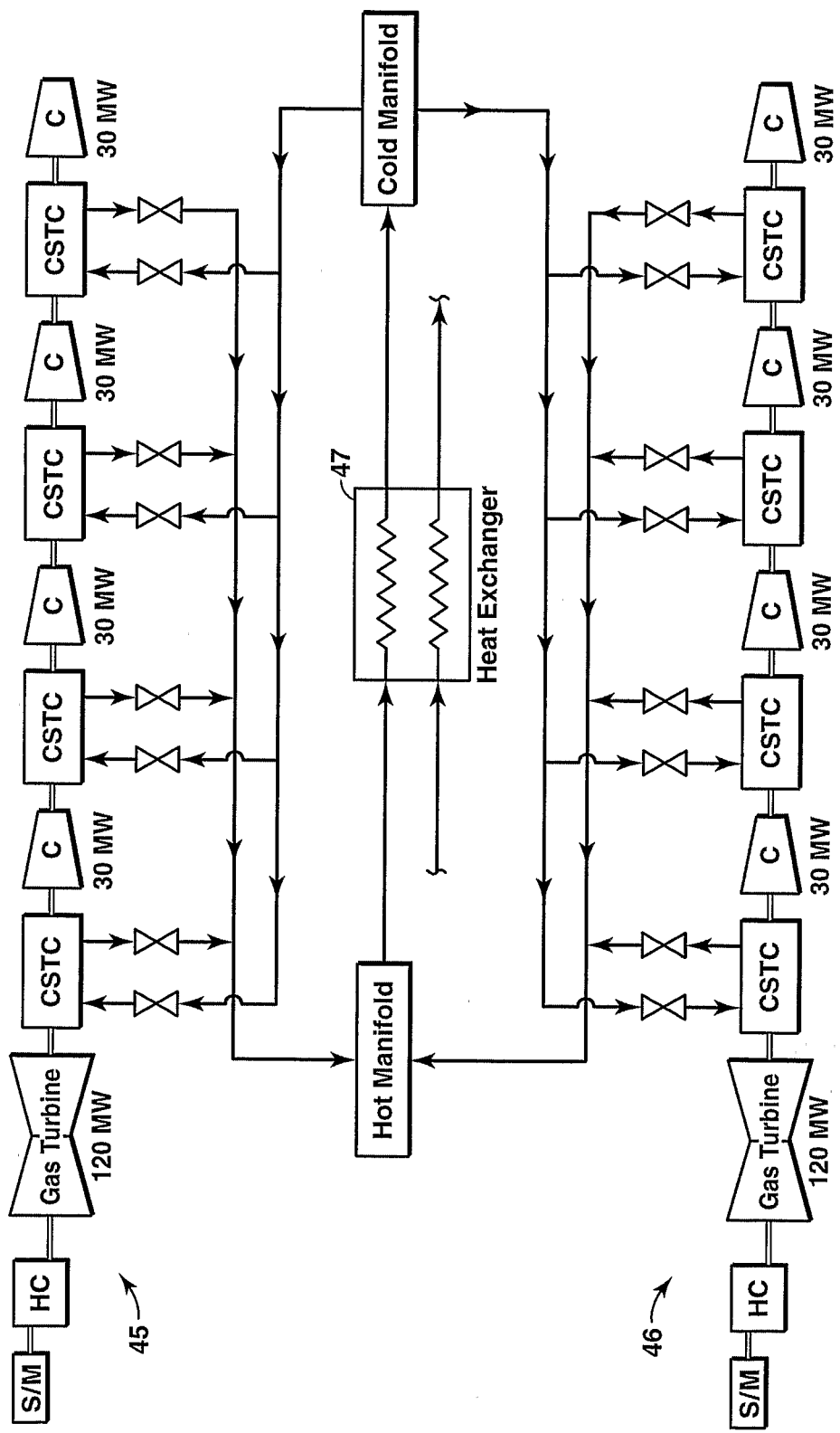
FIG. 8 is a schematic diagram of a single heat exchanger used for multiple CSTCs in two strings.

A single heat exchanger may be used for a multiplicity of strings. FIG. 8 shows a first string 45 and a second string 46 whose multiple CSTCs use a common heat exchanger 47. Appropriate working fluid supply and discharge valves are provided for each CSTC in each string. In such a case where a single exchanger is employed for multiple strings, each string will require a stage start-sequence just as multiple compressors on a single string must be stage started. However, the single heat exchanger may also be sized to operate multiple CSTCs simultaneously across some or all strings. For instance, where it is necessary to start a multiplicity of strings simultaneously, a single heat exchanger may be sized for the required cooling performance.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

It is noted that the foregoing examples have been provided merely for the purpose of explanation and are in no way to be construed as limiting of the present invention. While the present invention has been described with reference to an exemplary embodiment, it is understood that the words that have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of cooling the working fluid of multiple variable speed hydraulic torque converters in a string of rotating power equipment including a prime mover driving multiple compressors, and multiple variable speed fluid torque converters for starting at least one of said compressors followed by other torque converters starting other compressors, in succession, said prime mover being connected to a first variable speed fluid drive torque converter, and said first torque converter being connected to a first compressor, and a second torque converter connected to said first compressor and in turn connected to a second of said compressors, at least a third torque converter connected to said second compressor and in turn connected to a third of said compressors, said torque converters and said compressors being positioned in an in-series configuration, each of said torque converters providing an output from zero to full speed, each of said torque converters including a supply conduit for cooled working fluid, and a discharge conduit for the heated working fluid, said supply conduit and said discharge conduit for each of said torque converters being connected to a single heat exchanger, and including a discharge valve in each of said discharge conduits and a supply valve in each of said supply conduits, wherein each torque converter includes a lock-up mechanism, engaged at full speed, whereby all power is transmitted mechanically and the input and output speed is synchronized, wherein the method comprises:

starting the prime mover;

opening the supply and discharge valves of said first torque converter while keeping all other valves to said second and third torque converters closed to permit the working fluid to flow through said first converter and said single heat exchanger;

starting said first compressor and increasing the speed up to full speed;

closing the supply and discharge valves to said first torque converter;

opening the supply and discharge valves to said second torque converter while keeping all other valves closed to permit the working fluid to flow through said second torque converter and said single heat exchanger;

starting said second compressor and increasing its speed to full speed; and closing the supply and discharge valves to said second torque converter, opening the supply and discharge valves of said third torque converter while keeping all other valves to said first and second torque converters closed to permit the working fluid to flow through said third converter and said single heat exchanger;

starting said third compressor and increasing the speed up to full speed;

closing the supply and discharge valves to said third torque converter;

whereby each of said torque converters can be successively isolated from said single heat exchanger in turn and each of the torque converters is locked up at full speed, successively, to enable full power transmission mechanically such that working fluid is no longer required.

2. The method according to claim 1, wherein said first and second variable speed hydraulic torque converters have different cooling needs and further comprising:

providing a heat exchanger with a capacity to satisfy the greater cooling needs.

3. The method according to claim 1, wherein the heat exchanger is supplied with working fluid from a hot manifold and discharges working fluid to a cold manifold, and wherein the method further comprises:

supplying working fluid through said discharge valves to said hot manifold, and supplying fluid through said supply valves from said cold manifold to each torque converter.

4. The method according to claim 1, further comprising a third and a fourth compressor and third and fourth torque converters, and wherein the method further comprises:

opening the supply and discharge valves to said third torque converter while keeping all other valves closed to permit the working fluid to flow through said third torque converter and said single heat exchanger;

starting said third compressor and increasing the speed up to full speed;

closing the supply and discharge valves to said third torque converter;

opening the supply and discharge valves to said fourth torque converter while keeping all other valves closed to permit the working fluid to flow through said fourth torque converter and said single heat exchanger; and starting said fourth compressor and increasing its speed to full speed.

5. The method according to claim 1, wherein a second string of equipment is provided, said second string including a plurality of variable speed fluid torque converters and a plurality of compressors, and wherein the method comprises:
   providing the torque converters of said second string with supply and discharge conduits for the working fluid; and
   connecting said supply and discharge conduit to said single heat exchanger,
   whereby said single heat exchanger is usable by more than one string of equipment.

6. The method according to claim 1 wherein said prime mover is a turbine.

7. The method according to claim 6 comprising a starting package having a starting motor and a starting VFD.

8. The method according to claim 6 comprising a starting package having a starting motor and a starting hydraulic clutch.

9. The method according to claim 1 wherein said prime mover is a motor.

10. The method according to claim 9 comprising a starting package having a starting motor and a starting VFD.

* * * * *